US006658788B1

(12) United States Patent
Steinfest (10) Patent No.: US 6,658,788 B1
(45) Date of Patent: Dec. 9, 2003

(54) TWO DOOR ANIMAL TRAP AND CAGE DEVICE

(76) Inventor: Dale R. Steinfest, 17600 Brooklawn Dr., Brookfield, WI (US) 53045

( * ) Notice: Subject to any disclaimer, the term of this patent is extended or adjusted under 35 U.S.C. 154(b) by 0 days.

(21) Appl. No.: 10/167,900

(22) Filed: Jun. 12, 2002

(51) Int. Cl.⁷ .............................................. A01M 23/02
(52) U.S. Cl. ....................................................... 43/61
(58) Field of Search ................................ 43/58, 60, 61, 43/62

(56) References Cited

U.S. PATENT DOCUMENTS

| | | | | |
|---|---|---|---|---|
| 1,158,185 | A | * | 10/1915 | Danielson ....................... 43/61 |
| 2,342,444 | A | * | 2/1944 | Alday ............................. 43/61 |
| 2,374,522 | A | * | 4/1945 | Andrews ......................... 43/61 |
| 3,174,250 | A | * | 3/1965 | Gilbert ............................ 43/61 |
| 4,080,749 | A | * | 3/1978 | Gilbaugh ........................ 43/61 |
| 4,899,484 | A | * | 2/1990 | Morin ............................. 43/61 |
| 5,345,710 | A | * | 9/1994 | Bitz ................................ 43/61 |
| 5,778,594 | A | | 7/1998 | Askins et al. |
| 6,484,436 | B1 | * | 11/2002 | Chang ............................ 43/61 |

* cited by examiner

Primary Examiner—Kurt Rowan
(74) Attorney, Agent, or Firm—Joseph S. Heino (57) ABSTRACT

A live trap and cage assembly has a base, opposing sidewalls and a central main support section. To either end of the sidewalls is a door. Each door is movable from an upper position to a lower position. The doors are configured so as to be quickly moveable from the upper position to the lower position upon the triggering of an event inside the assembly. The base of the assembly includes a bait reservoir or "billboard" which is situated to the exterior of the assembly, and a bait holder and release mechanism which is situated to the interior of the assembly. The bait holder is suspended within the interior of the assembly by a cable which extends downwardly from the central support of the assembly. The cable is attached to each of the opposing doors and allows full movement of each door from the upper position to the lower position. The bottommost portion of the bait holder is slidably attachable to a "trigger" bracket. Upon movement of the bait holder within the assembly by a lateral force applied to the bait holder by the animal, the bait holder slides out of the trigger bracket which releases the bait holder and the cable which is under tension, thereby instantaneously moving the opposing doors from the upper position to the lower position and trapping the animal within the assembly.

24 Claims, 6 Drawing Sheets

TWO DOOR ANIMAL TRAP AND CAGE DEVICE

FIELD OF THE INVENTION

This invention relates to devices for live-capturing small animals and the like. More particularly, this invention relates to a two door live-capture animal trap and cage device which utilizes physical features in construction for gaining the confidence of a small animal in the trap device as the animal investigates the device and prior to its capture. It also relates to such a trap and cage device which maintains the animal, once trapped and caged within the device, in a safe and humane manner until the animal can be relocated to a new habitat. It also relates to a device that allows for the safe transfer of the trapped animal from the device to a secondary holding device, which secondary holding device can safely hold a number of animals at one time within individual compartments thereby preventing the animals from accessing and harming one another until released.

BACKGROUND OF THE INVENTION

Animal traps have been used by mankind for thousands of years. Early on, a trap could be a device as simple as a hole in the ground or a carefully set snare which was set along the well-traveled trail of some woodland creature. Indeed, the major incentive for such trapping was survival and sustenance in the forms of food and clothing for the early trapper. The key to the success of such early devices oftentimes was the ability of the trapper to adequately conceal the traps from the unwary animal which was intended to be trapped. Placing small, loose branches over the hole would work as would placing blades of grass around the snare, each working to conceal the trap from the animal.

Although the incentives of hunger and lack of clothing have, for the most part, been eliminated in the modem world, mankind still needs to capture small animals from time to time. The incentive now is more a nuisance avoidance mechanism than any other. Accordingly, the need for traps still exists in this modem age. Consistent with the notions of animal rights and preservation, however, anyone seeking to capture small animals these days is acutely aware of the need to capture them live and then to release them, unharmed, to a new habitat where they can be of little or no nuisance in their new location.

In the experience of this inventor, small animal traps of the modem variety tend to assume the form of a single entrance trap or even a two door trap which presents itself in a very ominous way from the animal's point of view. That is, most small animals are smart or experienced enough to know that entry into an opening from which no other apparent exit exists is probably not a good idea. Similarly, a trapping device or contraption which has too many metal parts and all the outward appearances of a cage is probably not one that an animal will care to pass through either. In this inventor's experience, the true success of the modern trap continues to lie in the trapper's ability to conceal the truly perilous nature and danger of the device. It also lies in the trapper's ability to override any perceived or apparent danger by appealing to the animal's most basic instinct for survival, to gather and eat food. To this end, the modern trap can and should be made to look and feel like a feeding station. This effect is enhanced by sprinkling loose bait about the trap to make it appear to the animal that it is not the first of its kind to venture near the device and be successful in having a meal.

Accordingly, it is an object of the present invention to provide a new and useful animal trap and cage device which has a very unassuming appearance from the viewpoint of the animal. It is a further object of the present invention to provide such a trap which is easy to construct and which can be operated with a minimal number of steps. It is still another object of the present invention to provide such a trap which can lure a wide variety of small animals into it by varying its size and the lure. It is yet another object of the present invention to provide such a device which can quickly and efficiently trap an animal and keep the animal held within the trap for transportation purposes well after the animal is trapped inside. It is still another object of the present invention to provide such a device which enables the animal to survive within the device for a substantial period of time pending the relocation and release of the animal by providing it with a food and water supply and by providing means for protecting the animal from the elements. It is yet another object of the present invention to provide a safe and secure means for transferring the trapped animal from the device to a secondary holding device, which secondary holding device includes a number of compartments for holding a number of animals within it. It is still another object of the present invention to provide such a device and secondary holding device which effectively protects the trapper from retaliation on the part of the trapped animal by biting or scratching the trapper, or even by sticking the trapper with quills. It is yet another object of the present invention to provide such a device that allows for a covering for the device which protects the trapper from retaliation on the part of a trapped skunk that might be inclined to spray the trapper.

SUMMARY OF THE INVENTION

The present invention has obtained these objects. It provides for a live trap and cage assembly having a base, opposing sidewalls and a central main support section. To either end of the sidewalls is a door. Each door is movable from a lower position which effectively seals the interior of the assembly from the outside and an upper position in which the assembly is completely accessible to the outside. The doors are configured so as to be quickly moveable from the upper position to the lower position upon the triggering of an event inside the assembly. The base of the assembly includes a bait reservoir or "billboard" which is situated to the exterior of the assembly, and a bait holder and release mechanism which is situated to the interior of the assembly. The bait holder is suspended within the interior of the assembly by a cable which extends downwardly from the central support of the assembly. The cable is attached to each of the opposing doors and allows full movement of each door from the upper position to the lower position. The bottommost portion of the bait holder is slidably attachable to a "trigger" bracket which allows the bait holder to be movable from one position to another. The assembly, in a preferred embodiment, is constructed such that the base and each of the opposing sidewalls are constructed such that the base and each of the opposing sidewalls are configured from a wire mesh or mesh-like material, which mesh is relatively innocuous from the view of the animal. Upon movement of the bait holder within the assembly by a lateral force applied to the bait holder by the animal, the bait holder slides out of the trigger bracket. An opening defined within the trigger bracket effectively releases the bait holder and the cable which is under tension due to the weight of each of the doors pulling on it, thereby instantaneously moving the opposing doors from the upper position to the lower position and trapping the animal within the assembly. During this rapid downward movement of the doors, the animal's reaction time is substantially diminished due to its preoccupation with the bait contained on the bait holder. Each of the opposing doors includes a horizontal portion which may also include a removable panel for providing either a clear or opaque panel for protecting the animal, once trapped, from rain and snow or from a hot sun, respectively. In the preferred embodiment of the device of the present invention, a mechanism is also provided for ensuring that the doors cannot be forced open, even slightly, so as to allow the trapped animal a means for escape. In the preferred embodiment, a secondary access door is provided which allows the device to be joined to a seconday holding device whereby the animal can exit the device through the secondary access door and enter the secondary holding device. The secondary holding device incorporates a plurality of compartments such that a number of captured animals can be held within it. Once trapped or caged, the animal can be transported from its trap site to a new location in a fashion which is safe for the animal and for the trapper alike. A covering for the device may also be provided to allow for additional protection of the user when a skunk wanders into and is trapped by the device. The foregoing and other features of the device of the present invention will be further apparent from the detailed description which follows.

DETAILED DESCRIPTION

Figure 1:
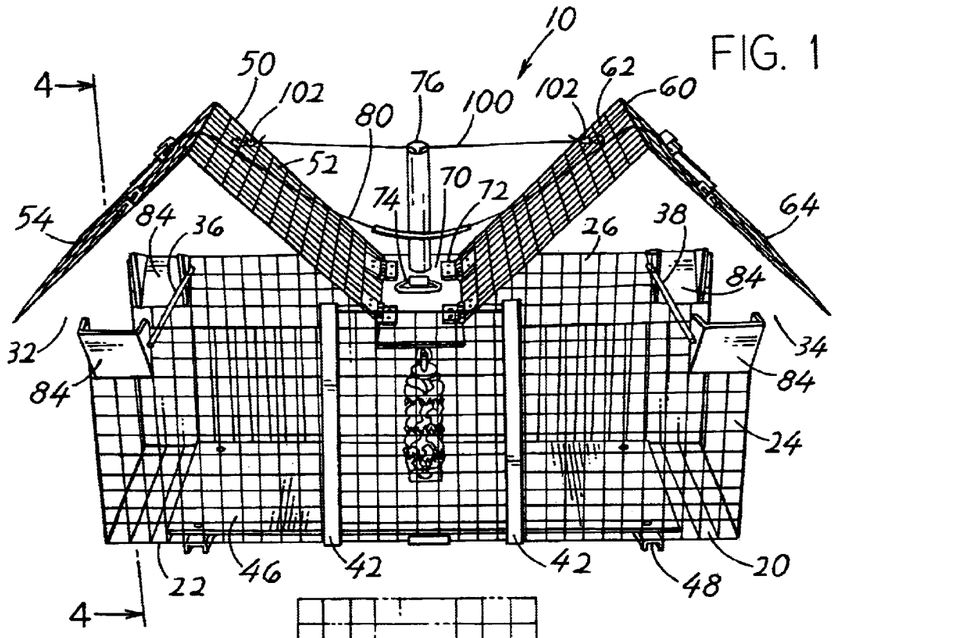
FIG. 1 is a front and top perspective view of a trap and cage device constructed in accordance with the present invention and showing the doors of the device in a fully open position.

Referring now to the drawings in detail where like numbered numerals refer to like elements throughout, FIG. 1 illustrates a preferred embodiment of the trap and cage assembly or device of the present invention, said trap and cage device being generally identified 10. The trap and cage device 10 includes a generally U-shaped main frame member 20. The U-shaped main frame 20 is constructed of a rigid, but bendable, wire-mesh material. Although this inventor has utilized a 1 inch square wire-mesh material, it is to be understood that any number of similar materials could be used without deviating from the scope of the present invention. The main frame 20 includes a horizontally planar floor 22, a first vertically planar sidewall 24 and a second vertically planar sidewall 26, the first and second planar sidewalls 24, 26 being generally parallel to one another. It is also to be understood that the main frame 20 could be manufactured from a single piece of material or the floor 22 and the sidewalls 24, 26 could be constructed from separate pieces of material and then assembled without deviating from the scope of the present invention. To either end of the main frame 20 is a first access opening 32 and a second access opening 34. It is the purpose of this main frame 20 configuration to present an unassuming trap and cage body which is, for the most part, unassuming to the animal, thus creating a general sense of safety for the animal that comes across the trap and cage device 10 and is attracted to it. In the preferred embodiment, a solid floor plate 46 and a plurality of feet 48, in the form of inverted U-shaped channels, are provided. Also in the preferred embodiment, a side access door 40 is provided, the side access door 40 being vertically moveable along door channels 42 that are integrally formed with the sidewall 24. The function and purpose of the side access door 40 will become further apparent later in this detailed description.

Though intended to be generally rigid, the first and second planar sidewalls 24, 26 of the main frame 20 are somewhat resilient, particularly when a trapped animal is contained within the assembly 10. In the experience of this inventor, a trapped animal can extricate itself through even the smallest opening when the animal perceives that it is in mortal danger. Accordingly, the first and second sidewalls 24, 26 of the main frame 20 include a first support rod 36 and a second support rod 38, the first and second support rods 36, 38 being generally perpendicular to and extending between the first and second sidewalls 24, 26 so as to give the sidewalls 24, 26 additional rigidity. The first and second support rods 36, 38 are attachable to the first and second sidewalls 24, 26 by means of fasteners or may be welded into place.

Also extending between the first and second sidewalls 24, 26 of the main frame 20 is a central frame cover portion 70. The central frame cover member 70 extends generally perpendicularly between the first and second sidewalls 24, 26. The central frame cover portion 70 may be secured to the first and second sidewalls 24, 26 by means of fasteners (not shown) or by weldment. The central frame cover portion 70 also includes a handle 74 for ease of transport of the device 10.

Figure 2:
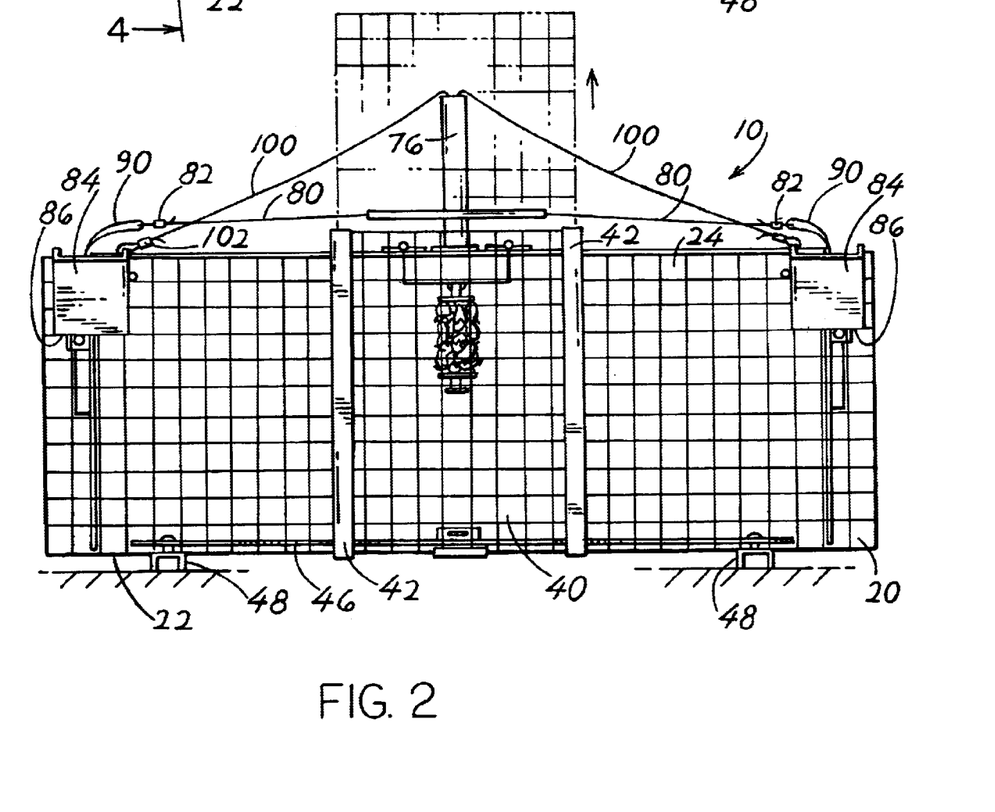
FIG. 2 is an enlarged front elevational view of the trap end cage device shown in FIG. 1, and showing the doors of the device in a fully closed position.
Figure 3:
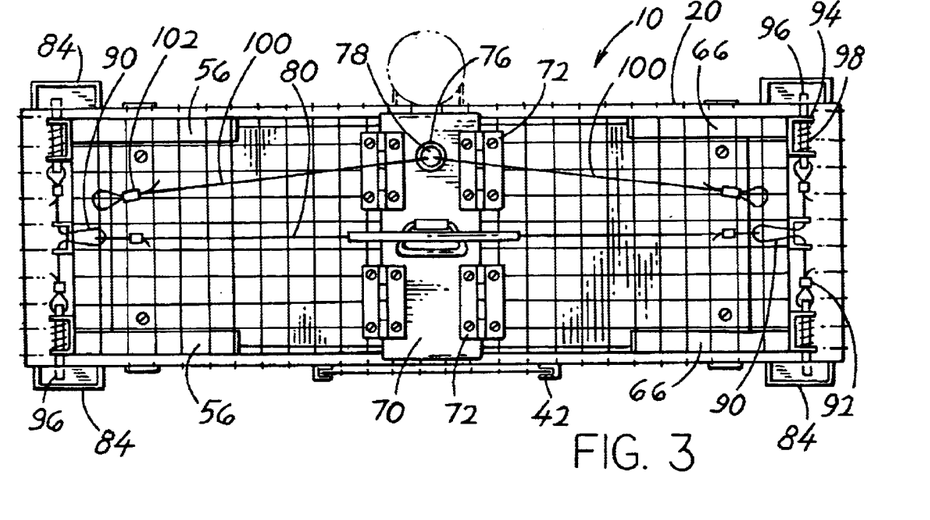
FIG. 3 is a top plan view of the trap and cage device shown in FIG. 2, and also showing the doors of the device in a fully closed position.
Figure 4:
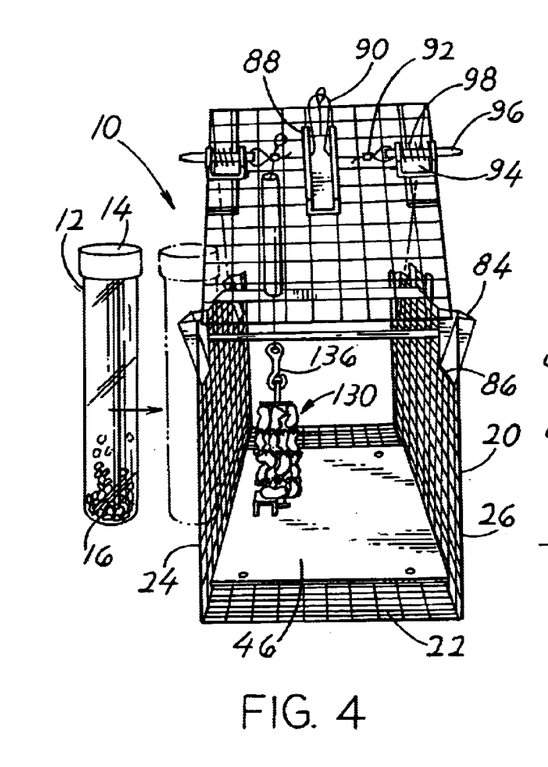
FIG. 4 is a top and left side perspective view of the trap and cage device as shown in FIG. 1, taken along line 4—4 thereof, showing a food reservoir used with the device which acts as a "food billboard" to wild animals and also showing the doors of the device in a fully open position.

Extending to either side of the central frame cover portion 70 is a first L-shaped door 50 and a second L-shaped door 60. The first and second doors 50, 60 are rotatably attached to the central frame cover portion 70 by means of hinges 72. It should be noted here that the positioning of the doors 50, 60 in the "open" position as shown in FIG. 1 actually raises them above the sidewalls 24, 26, thereby enhancing the effect for the curious animal that the device 10 is open and unthreatening. Extending upwardly from the central frame cover portion 70 is a tubular cable conduit 76, the significance of which will become further apparent later in this detailed description. Each L-shaped door 50, 60 is, in essence, a mirror image of the other. The first door 50 includes a first top door portion 52 and a generally perpendicularly situated first side door portion 54. Similarly, the second door 60 includes a second top door portion 62 and a second side door portion 64. A pair of corner supports 56 provides rigidity between the first top door portion 52 and the first side door portion 54 of the first door 50. See FIG. 3. Similarly, rigidity is provided by the corner supports 66 of the second door 60. It should also be noted that the weight of the doors 50, 60 gives them the tendency to drop downwardly by means of gravity and move to the fully closed position as shown in FIG. 2. It should also be noted here that each door 50, 60 could be fabricated using other corner supports and the like, other than those shown, and still come within the scope of this invention. In fact, the doors 50, 60 could even be fabricated without such supports as long as each door 50, 60 is able to maintain its original L-shaped construction.

Figure 17:
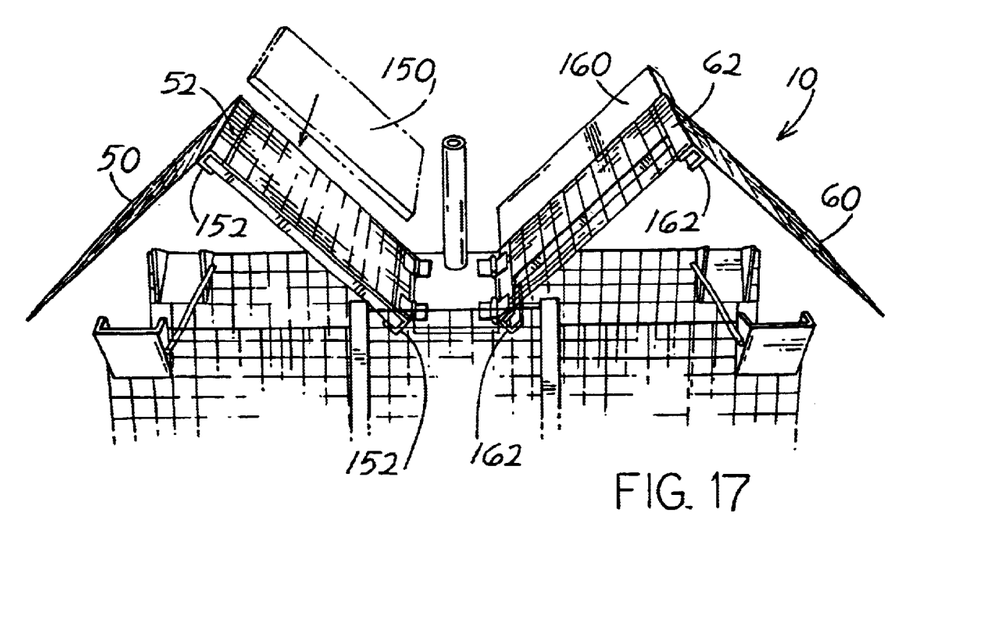
FIG. 17 is a partial top and front perspective view of the device shown in FIG. 1, showing the doors in the raised position, and illustrating the insertion of a panel along the horizontal portion of each door for protection of the trapped animal from the elements.

In the experience of this inventor, it is also important to preserve the well-being of the animal within the device 10 once the animal is trapped. To that end, this inventor has provided a means for protecting the animal from the heat of the sun and from rain and snow while it is contained within the device 10. Specifically, the horizontal portion 52, 62 of each door 50, 60, respectively, can be provided with means for slidably inserting a panel below it. See FIG. 17. As shown, the panels 150, 160 may be opaque for protecting the animal from the sun or may be clear for protecting the animal from rain and snow only. Each panel 150, 160 is insertable between a pair of opposing channels 152, 162 located to either edge of the top door portion 52, 62, respectively. In this fashion, the doors 50, 60 may include, or not include, a panel 150, 160 as such is desired or required.

Figure 5:
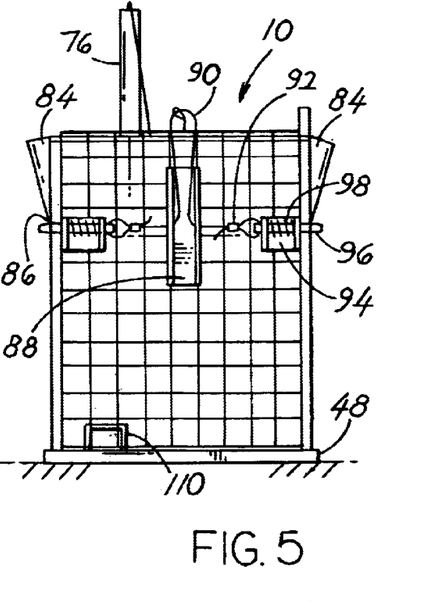
FIG. 5 is a right side elevational view of the trap shown in FIG. 4 and showing the doors in the fully closed position.

Further situated atop the central frame cover portion 70 is a stop assembly primary latch cable 80. This primary latch cable 80 could be made from a metal material, a nylon material, a poly plastic material, a sheathed material or any other material having substantial tensile strength. See FIGS. 1, 2 and 3. Each end of the primary latch cable 80 is looped and secured with a fastener 82. The looped end of the primary cable 80 is, in turn, threaded with a secondary latch cable 90. This secondary latch cable 80 could also be made from a metal material, a nylon material, a poly plastic material, a sheathed material or any other material having substantial tensile strength. See FIGS. 3 and 5. Affixed to each vertical door portion 54, 64 is a cable guide 88. The cable guide 88, in the preferred embodiment, is a generally U-shaped element having a pair of aligned openings (not shown) through which the secondary cable 90 is also threaded. For purposes of discussion, it is to be understood that this subassembly of the latch mechanism or latch assembly portion of the device of the present invention is identical on each door 50, 60. Accordingly, the detail of this subassembly will be discussed with respect to only one door, it being understood that the opposing door includes the same subassembly. Each end of the secondary cable 90 is also looped and secured by means of a fastener 92, but only after each end of the secondary cable 90 is threaded through one end of a latch pin 96. See FIG. 5. The latch pin 96 is secured within a bracket 94 and is biased outwardly of the door 50, 60 by means of a spring 98. This latch pin bracket and spring assembly 94, 96, 98 is duplicated at the opposite side of each door 50, 60 such that the pins 96 are axially aligned. A latch pin slide bracket 84 is attached at each of the upper corners of the sidewalls 24, 26. Each latch pin slide 84 is biased inwardly of the device 10 such that, upon the downward movement of the doors 50, 60, the latch pins 96 are urged inwardly to the point that the latch pin 96 passes the lowermost edge 86 of the slide 84 and is engaged thereby, each latch pin 96 extending fully outwardly. This prevents an animal from pushing the doors 50, 60 outwardly and from creating a crack or crevice between the doors 50, 60 and the floor 22 or sidewalls 24, 26 through which escape can be accomplished. In the experience of this inventor, the latch pin 96 must travel at least ¾ to 1 inch to prevent lateral movement of a sidewall 24, 26 from disengaging the pin 96. It is also to be understood that other latch mechanisms could be used in the device of the present invention without deviating from the scope of the present invention.

In the preferred embodiment, a food reservoir, or food "billboard" 12 is provided. In fact, a pair of such food reservoirs 12 may be provided, one attached to the outer surfaces of each sidewall 24, 26 of the assembly 10. The food reservoir 12 is similarly transparent and consists of a clear tubular structure having one or more end caps 14 which reservoir 12 is filled with a food substance 16 which is of interest to the animals sought to be captured. In the experience of this inventor, the food substance 16 could be corn, peanuts, seeds, or any other suitable consumable. The food reservoir contents 16 are inaccessible to the animal, but draw the animal in towards the device 10 where the truly accessible food, in the form of a bait holder assembly generally identified 130, is observable to the animal, thereby further enticing the animal to take a closer examination of the situation and to inevitably enter into the device 10. In this regard, the device 10 mimics a feeding station. The effect can be enhanced by sprinkling individual seed kernels or peanut shells along the device floor 22, floor plate 46, and even outside the device 10 and leading up to it. All of this reinforces the notion that the device 10 is safe and that other animals have recently fed from it, coming and going at will.

Figures 6, 7:
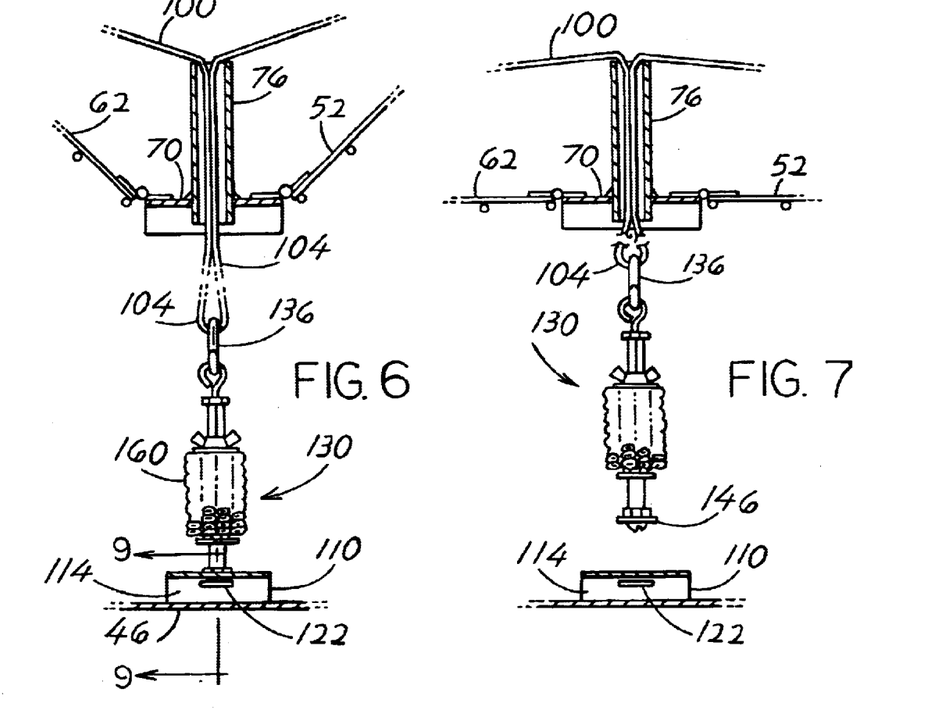
FIG. 6 is a further enlarged and partially cross-sectioned front elevational view of the bait holder and trigger bracket of the trap and cage device shown in FIG. 1 and showing the device in its "untriggered" mode prior to activation by an animal.
FIG. 7 is another partially cross-sectioned front elevational view of the bait holder and trigger bracket shown in FIG. 6 and showing the device in its "triggered" or trap mode following activation by an animal.
Figures 11, 12, 13:
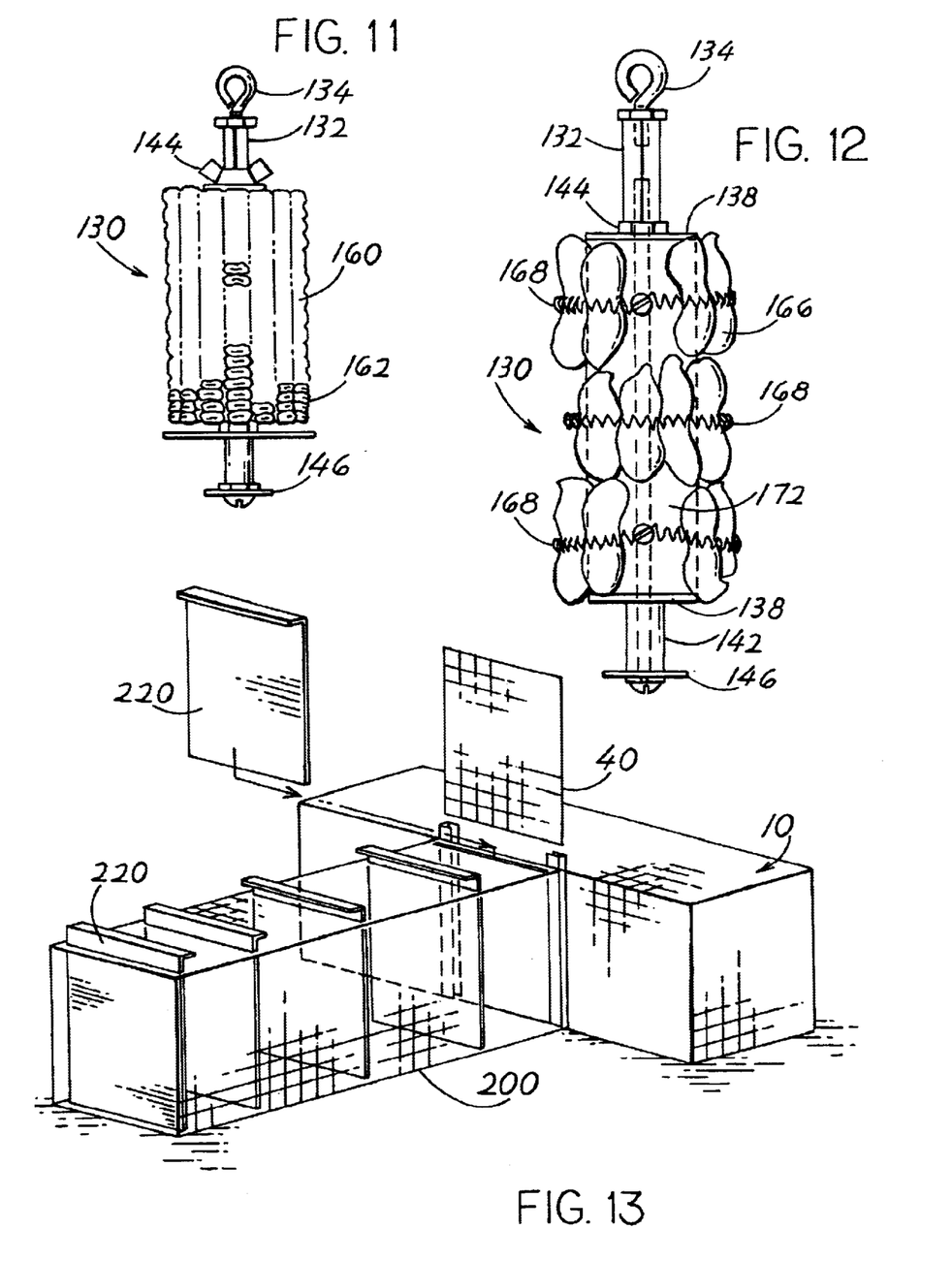
FIG. 11 is a front elevational view of a bait assembly used with the device of the present invention and showing a segment of a cob of corn.
FIG. 12 is a further enlarged front elevational view of the bait assembly illustrated in FIGS. 1, 2, 4, 6 and 7 and showing an alternative bait, whole peanuts, which are removably attached to a bait core via springs.
FIG. 13 is a front, top and right side perspective view generally of the trap and cage device shown in FIGS. 1 through 5 and showing a secondary holding device used in conjunction with the device.

As previously disclosed, the central frame cover portion 70 includes a tubular cable conduit 76 which extends upwardly and generally perpendicularly from the central frame cover portion 70. The conduit 76 has a conduit interior 78 through which can pass a cable 100, the ends of which are looped through a portion of each door 50, 60 and secured with a fastener 102. See FIG. 3. Under the weight of the doors 50, 60, the cable 100 is held in tension. This inventor has found that a conduit 76 having a height of 6 inches provides optimum performance of the device. At this height, door action is maximized. It is also to be understood, however, that other trigger mechanisms could be used without deviating from the scope of this invention. The cable 100 is looped 104 at the interior of the assembly 10 in such fashion that a fastener 136, such as an S-shaped hook 136, can be slidably attached to that portion of the cable 100 that forms the loop 104. The S-shaped hook 136 is but one part of the bait holder assembly 130 and can also take the form of an open and closing clip. The idea is that it is this hook or clip 136 which is the structure to which the other portion of the bait assembly 130 can be quickly and easily detached and reattached as such is desired or required, the precise form of slidable attachment not being a limitation of this Invention. The S-shaped hook or clip 136 is attached to a downwardly extending central bolt portion 142 about which is situated a bait 160, which is shown in FIGS. 6, 7 and 11 as a longitudinal section of a cob of corn 162. The uppermost portion of the bait 160 can be constructed such that the bait 160 breaks away from the clip 136 when the trapped animal begins to be overly aggressive with the bait 160. In FIGS. 1, 2, 4 and 12, the bait is a number of peanuts 166 that are held in place by use of a number of circumferentially connected springs 168. This latter configuration is preferred by this inventor for the reason that the peanuts may be easily mounted and replenished as required. This inventor has learned from personal experience that such springs 168 may become stretched and deformed by a determined animal and that, accordingly, an alternative embodiment would be to use a rubber cord or the like (not shown). Such rubber cords may be stretched, but do not become deformed during use. It is also possible to use a wire clamp type device (also not shown) to attach peanuts, raw meat, fish, fruit or any other foodstuff to the bait 160. The bait 160 may also be prepackaged for the convenient ease of use and replacement by the user who simply doesn't want to fuss or bother with changing the foodstuff affixed to the bait 160, Such prepackaged bait assemblies or food cartridges would be easy to use and easy to replace as such is desired or required.

Figure 8:
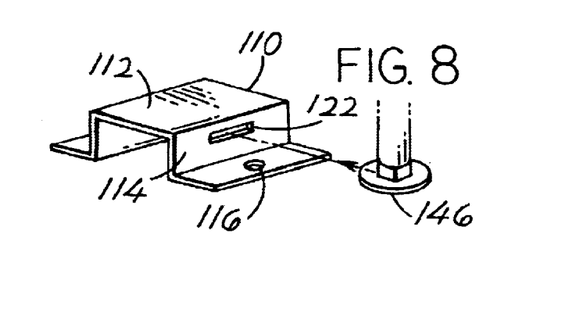
FIG. 8 is a further enlarged rear, right side and top perspective view of the trigger bracket of the device shown in FIGS. 6 and 7.
Figure 9:
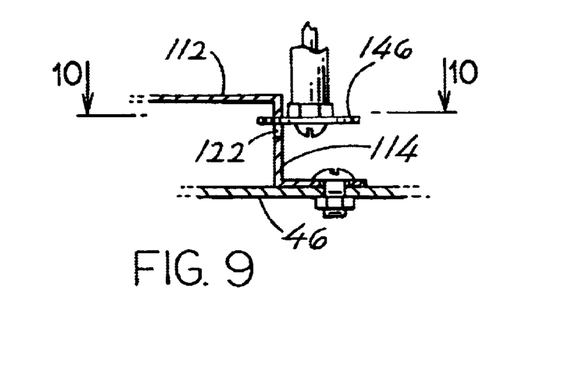
FIG. 9 is a further enlarged cross-sectioned right side elevational view taken along line 9—9 of FIG. 6 and showing further detail of the trigger bracket and bait holder shown in FIGS. 6, 7 and 8.

In any event, the central bolt portion 142 terminates in the lower portion of a threaded receiver 132. In this fashion, the bait 160 may be removable from the bait assembly 130. An eye bolt 134 is situated at the upper portion of the threaded receiver 132, the eye bolt 134 being attachable to the S-shaped hook 136. Means are provided for securing the bait 130 about the bolt portion 142 by means of various hardware items including a pair of support plates 138 and fasteners 144. Extending at the lower most portion of the bolt portion 142 is an annular flange or slide washer 146. In the preferred embodiment, bait assembly 130 and all parts relative to it are constructed of nonferrous materials so as to prevent rusting due to exposure to the elements. See FIGS. 8 and 9.

Figure 10:
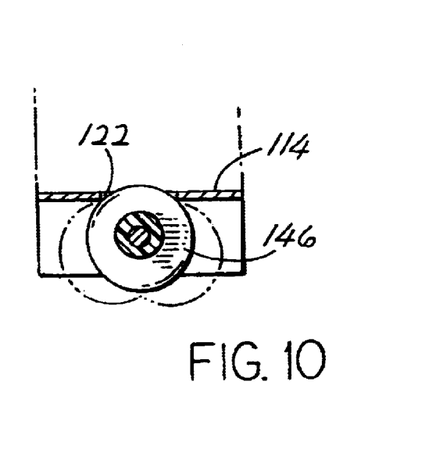
FIG. 10 is a top plan view of the trigger bracket shown in FIG. 9 and taken along line 10—10 thereof.

The annular flange or slide washer 146 is insertable within a slot or opening 122 which is defined within the trigger bracket, generally identified 110. See FIG. 8. The trigger bracket 110 includes a raised central portion 112 which is supported to either side by a pair of legs 114. It is in one of these legs 114 that the slot 122 is defined. The trigger bracket 110 is attachable to the floor 22, 46 of the main frame 20 by means of fasteners 152 which extend through fastener openings 116 which are defined within the bracket legs 114. It is to be understood that while the frictional coefficient between the slide washer 146 and the bracket 110 is to be low so as to allow smooth and easy movement between the two elements, the movement should not be so low as to trigger the movement simply by wind or other natural forces which may act upon the device 10. In the experience of this inventor, engagement of the washer 146 with the slot 122 on the order of ¼ inch is sufficient to prevent inadvertent tripping of the device 10 by such environmental forces, or even from a curious animal sending vibrations through the device 10 as it climbs over and on top of the device 10 and checks it out. See FIG. 10. It is also understood that the trigger bracket 110 could instead include a dumbbell shaped aperture (not shown) defined within the raised central portion 112 of the trigger bracket 110 and the bottommost portion of the bait 160 could instead include a ball or bulb (also not shown) slidably movable along the bracket 110 as the trip mechanism.

Figure 14:
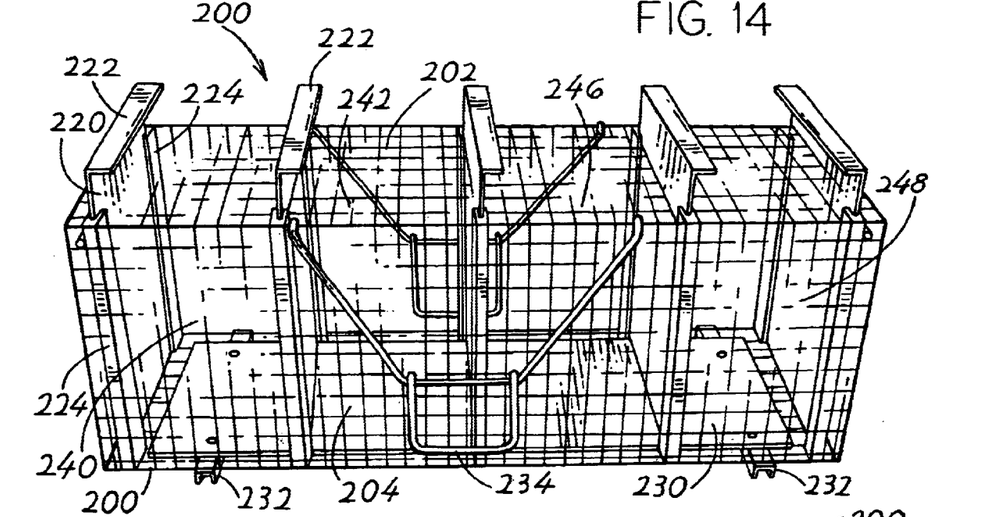
FIG. 14 is a front and top perspective view of the secondary holding device shown generally in FIG. 13.
Figure 15:
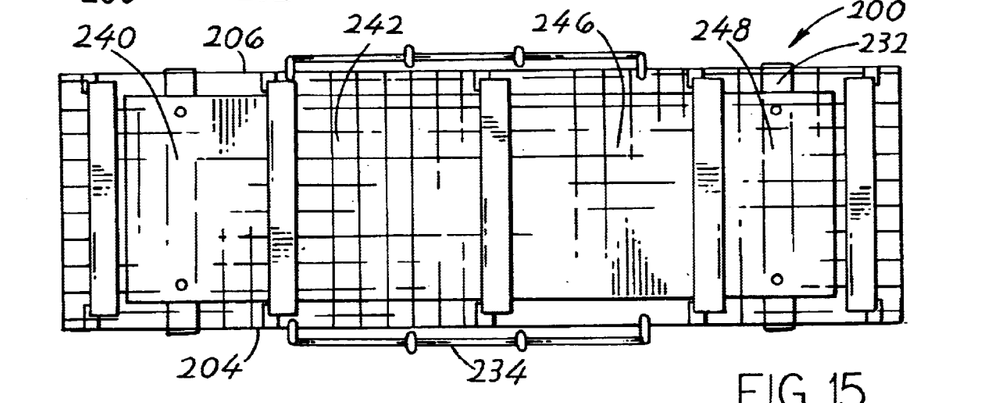
FIG. 15 is a top plan view of the secondary holding device shown in FIG. 14.

Referring now to FIG. 13, the secondary holding device, generally identified 200, is illustrated. As shown, the secondary holding device 200 comprises a generally box-like appearance and is dimensioned somewhat similarly to the primary trap and cage device 10. The secondary holding device 200 includes a horizontally planar top 202, a pair of vertically planar sidewalls 204, 206 and a horizontally planar bottom 208 and may be formed of a single piece of material. As was true of the primary device 10, the inventor has configured the secondary holding device 200 from a rigid, but bendable, wire-mesh material. Although this inventor has utilized a 1 inch square wire-mesh material, it is to be understood that any number of similar materials could also be used without deviating from the scope of the present invention. The secondary holding device 200 also includes a floor 230 and a plurality of legs 232 in the form of inverted U-shaped channels to elevate the device 200 up and off of the ground. See FIG. 14. As shown, the secondary holding device 200 may be separated into a number of animal retaining compartments 240, 242, 246, 248 by means of a plurality of slide doors 220. Each slide door 220 is vertically movable along a pair of opposing door channels 224. Each slide door 220 includes a door lip 222 for ease in grasping the door and moving it upwardly or downwardly as such is desired or required. As shown, the secondary holding device 200 could be configured to be divided into two compartments, three compartments or any other number of compartments, including compartments of different size and shape. The secondary holding device 200 also includes a pair of opposing handles 234 for transporting the device 200.

In application, the trapper would locate the device 10 in an area where a "problem" animal has been actively observed. The bait 160 would be attached to the bait assembly 130. The bait 160 of choice would depend upon the animal sought to be trapped and relocated. For squirrels, it might be a corn cob segment or peanuts attached to the bait assembly 130. This inventor envisions an infinite variety of such baits 160, many of which could be preassembled for ease of use by the end user. The bait assembly 130 is lowered into the vicinity of the trigger bracket 110. The slide washer 146 of the bait assembly 130 is inserted into the slot 122 of the trigger bracket 110. In this fashion, the cable 100 is drawn through the cable conduit 76 and down into the interior of the assembly 10 thereby raising the doors 50, 60. The first and second openings 32, 34 of the main frame 20 are then fully accessible to the animal and then it is simply a matter of time and overcoming the animal's apprehension. It should be noted again that several bait alternatives could be available, depending upon the type of animal to be trapped. For example, a segment of a cob of corn 162 could be used as is shown in FIGS. 6, 7 and 11. Alternatively, peanuts 166 could be secured to a central core member 172 as is shown in FIGS. 1, 2, 4 and 12 by means of springs 168, or meat, fish, apple slices or any other foodstuff to which animals are attracted could be secured to the core member 172.

As the animal approaches the device 10, the animal is drawn in by the presence of the food reservoirs 12 located to the exterior of the device 10. Determining that it cannot access the contents 16 of the reservoirs 12, the animal moves on only to return later for another look at the matter. As the sidewalls 24, 26 fade into the background, which effect may be enhanced by simply painting them green, and the animal gains confidence that this object poses little, if any, threat to the animal, the animal moves into the vicinity of either opening 32, 34. This behavior can be encouraged by the placement of loose peanut shells, corn kernels, etc. about the device 10 and even on the floor 22, 46 of it. The animal enters the main frame 20 to check out the situation.

It should also be noted at this point that a very important feature of the device 10 of the present invention is the fact that the bait assembly 130 in the preferred embodiment is strategically located to one side of the main frame 20. See FIG. 4. In this fashion, the animal's perception of threat is further minimized by the appearance of a clear path of escape through the device 10. In the experience of this inventor, an animal may pass through the main frame 20 several times before it starts to investigate the bait assembly 130 itself.

When the animal finally does investigate the bait assembly 130, the animal will move the slide washer 146 along the slot 122 by a force which has any force component in the direction of the slot alignment. See FIG. 10. As the slide washer 146 continues to be urged along by the animal's exertion of slight force upon the bait assembly 130, the slide washer 146 moves out of the slot 122 to the point that the slide washer 146 "pops out of" the slot 122. Almost instantaneously, the cable 100, which is under tension, moves the opposing doors 50, 60 from the upper position to the lower position and traps the animal within the device 10. During this movement of the doors 50, 60, the animal's reaction time is substantially diminished due to its preoccupation with the bait 160 contained on the bait assembly 130. The presence of a bottom floor plate 46 also prevents the animal from gaining any traction it its attempt to scurry away. Also at this instant, each pin 96 has slid along the corresponding slide bracket 84 and has become engaged with the lower edge 86 of that slide bracket 84. This action provides a locking function when the doors 50, 60 are in their fully closed position. This prevents the animal from pushing the doors 50, 60 outwardly and from creating a crack or crevice between the doors 50, 60 and the floor 22 or sidewalls 24, 26 through which escape can be accomplished.

Once trapped or caged, the animal can survive for some time until the trap is visited by the trapper due to the availability of a food source 160 within the device 10. The addition of a water bottle (not shown) is also a good idea insofar as it provides an additional temptation to the animal and a water supply once it is trapped. The presence of an optional clear panel 150, 160 within each of the doors 50, 60 protects the animal from rain and snow that may fall during its brief capture. See FIG. 17. The presence of an optional opaque panel 150, 160 within each of the doors 50, 60 will protect the trapped animal from the sun during daylight hours. Also while the animal is contained, the smooth floor 22 and sidewalls 24, 26 of the device 10 work to prevent the animal from getting much traction within the device 10 which might otherwise work to injure the animal's feet or claws.

Figure 16:
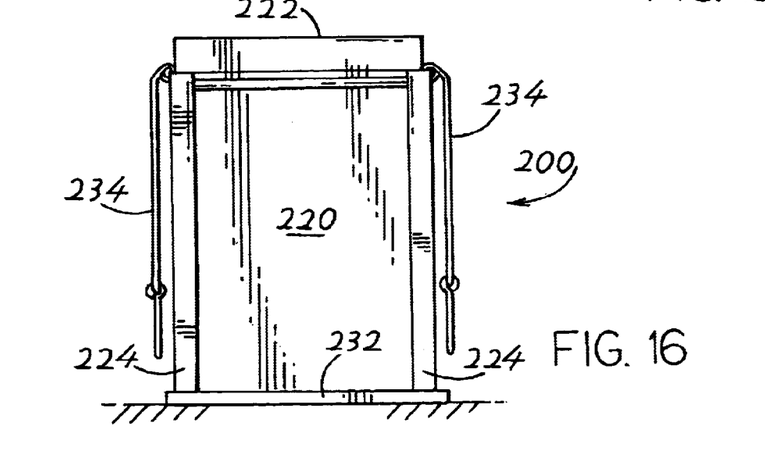
FIG. 16 is a right side elevational view of the secondary holding device shown in FIGS. 14 and 15.

When the trap or cage device 10 is visited, the trapper can safely move the device 10 without fear of being bitten, scratched, pecked, or quilled, or whatever else an animal in that predicament can dole out. Once relocated, the side access door 40 can be opened and the animal enters his new surroundings. Alternatively, the secondary holding device 200 can be butted up against the sidewall 26 in the area of the side access door 40. The user then elevates one or more of the slide doors 220 and the access door 40, thereby allowing the animal to exit the device 10 and enter the secondary holding device 200. As successive doors 220 are raised and lowered, the animal can be urged into different compartments 240, 242, 244, 246 of the secondary holding device 200 and a plurality of animals may be held at one time. The animals are prevented from having access to one another due to the solid surface of the intervening door 220. See FIG. 16.

Figure 18:
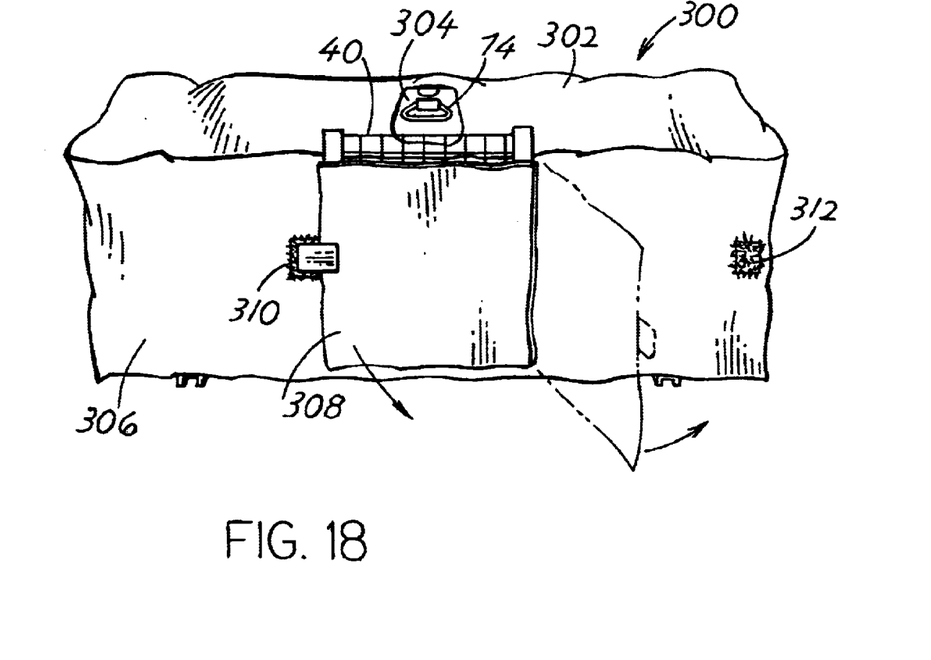
FIG. 18 is a top and front perspective view of the device shown in FIG. 1 and illustrating a covering that is used as an accessory to the device.

When the trapped animal is a skunk, or if the trapper simply wants to quiet the animal down during transportation to its new home, an optional covering 300 may be placed over the entire device 10. See FIG. 18. The covering may be fabricated of a canvas or vinyl material having a top 302 and sides 306. The top 302 of the covering 300 includes an opening 304 defined within it for accessing the device handle 74. Although shown without the cable conduit 76 in its usual place, it too fits through the covering opening 304 and, in fact, the covering opening 304 may also have two additional slits extending away from it to accommodate a portion of the cable 100 to either side of the conduit 76. Although not shown, the covering 300 may include a pouch along one of its sides 306 to accommodate the food reservoir or billboard 12 that is attachable to one sidewall 24 of the device 10. The covering 300 also includes a door flap 308 for accessing the side access door 40 of the device 10. In this fashion, the side access door 40 can still be used to allow for transfer of the animal to the secondary holding device 200 or to simply release the animal back into the wild. The door flap 308 is held in place by a Velcro® type fastener 310, 312 in either the closed or open position, respectively. A tray (not shown) may also be placed under the device 10 during transportation of the device in the user's vehicle to prevent soiling of the floor or seats by the animal during transport.

From the foregoing detailed description, it is apparent that there has been provided a new and useful animal trap and cage device which has a very unassuming appearance from the viewpoint of the animal; which is easy to construct and which can be operated with a minimal number of steps; which can lure a wide variety of small animals into it by varying its size and the bait; which can quickly and efficiently trap an animal and keep the animal held within the trap for transportation purposes well after the animal is trapped inside; which enables the animal to survive within the device for a substantial period of time pending the relocation and release of the animal; which effectively protects the trapper from retaliation on the part of the trapped animal by biting or scratching the trapper, pecking the trapper with a sharp beak, sticking the trapper with quills, or spraying it with a foul odorant; and which allows for the easy release of the animal into the wild or into a secondary holding device where a number of animals can be accumulated for a later release of all of them.

The principles of this invention having been fully explained in connection with the foregoing, I hereby claim as my invention:

1. A live animal trap and cage device which comprises
   a longitudinally extending base member, said base member having a floor and a pair of parallel sidewalls extending generally vertically upwardly from said floor, said base member having a first and a second opening at each longitudinal end of said base member as means for ingress and egress therethrough by an animal, a generally flat central support member extending between and being attached generally perpendicularly to each of said base member sidewalls, said central support member lying in a generally horizontal plane and including an aperture defined within it, a tubular conduit attached to and extending generally perpendicularly upwardly from the central support member at the central support member aperture, said conduit defining a continuous conduit interior that extends from an uppermost portion of the conduit to a lowermost portion of the conduit, a first and second door, each of said doors being formed in a generally L-shaped configuration and said first door being functionally adapted to cover the first base member opening and said second door being functionally adapted to cover the second base member opening, said doors being hingedly attached to said central support member, a cable having a first cable end, a central cable portion and a second cable end, said first cable end being attached to said first door and said second cable end being attached to said second door, said central cable portion being folded over onto itself and being routed through the conduit interior and through the central support member aperture thereby forming a cable loop that extends downwardly from the central support member, a fastener, said fastener being slidably attached to the cable loop that extends downwardly from the central support member, a bait assembly, said bait assembly being configured to hold a bait and further being configured to be attached to the fastener to suspend the bait assembly and bait from the cable loop and fastener and above the floor of the base member in feeding relation to an animal entering through either of the base member openings, and a bait assembly anchor, said bait assembly anchor being attached to the floor of said base member and directly below the central support member aperture and the suspended bait assembly.

2. The trap and cage device of claim 1 wherein said base member is U-shaped.

3. The trap and cage device of claim 1 wherein said base member, said first sidewall and said second sidewall are integrally formed from a single piece of material.

4. The trap and cage device of claim 1 wherein said base member includes a side access door defined within it.

5. The trap and cage device of claim 1 wherein said bait assembly comprises a vertically oriented central bait portion, said bait portion having an upper end and a lower end, and an annular flange located at said bait portion lower end wherein a bait can be used as the central bait portion or be held by it for attracting animals to the bait assembly, and wherein said bait assembly anchor includes a slot defined within it, said slot being configured to receive a portion of the annular flange therewithin, the annular flange portion being slidably movable out of the anchor slot when the bait assembly is moved in any horizontal direction relative to the anchor except directly towards the anchor.

6. The trap and cage device of claim 1 wherein each sidewall forms a generally rectangular planar wall having a pair of opposing upper corners and wherein the generally L-shaped first and second doors are each formed to include a horizontal portion and a vertical portion, such vertical portion forming a wall having a pair of opposing side edges and having an upper portion that extends between the side edges of the wall, and each door includes a locking mechanism for securing the doors when each door is covering a base member opening, said locking mechanism including a spring loaded latch pin located at each side edge of the upper portion of the vertical portion of each door and an inwardly biased latch pin slide located at each upper corner of the sidewalls, each slide having a lowermost edge such that, upon downward movement of the doors, the latch pins are urged inwardly to the point that each latch pin passes the lowermost edge of a slide and is engaged thereby, each latch pin extending outwardly when the door is in position to close an opening to the device.

7. The trap and cage device of claim 6 wherein the latch pins of each door are connected to each other with a primary latch cable, wherein a pulling force exerted on the primary latch cable draws the latch pins inwardly and releases them from engagement with the lowermost portion of each slide, and each primary latch cable is further connected to the other with a secondary latch cable, wherein a pulling force exerted on the secondary latch cable exerts pulling force on each of the primary latch cables such that the doors may be moved to a position to open each of the openings to the device.

8. The trap and cage device of claim 6 wherein a number of different baits can be used as the central bait portion or be held by it for attracting animals to the bait assembly.

9. The trap and cage device of claim 1 wherein said base member further includes at least one clear reservoir containing bait, said reservoir being removably attachable to an outer surface of said base member.

10. The trap and cage device of claim 1 including a secondary holding device for providing a plurality of animal holding compartments into which an animal may pass when it is allowed to exit through the side access door of the device.

11. The trap and cage device of claim 1 wherein the first and second doors include means for slidably inserting a removable protective panel, said panel providing protection from the elements for an animal being contained within the device.

12. The trap and cage device of claim 1 including a covering, said covering including a covering opening for accessing the device side door.

13. A device for live-trapping and caging an animal to facilitate the removal of the animal from one habitat to another which comprises a longitudinally extending U-shaped base member, said base member having a floor, a pair of parallel sidewalls extending upwardly from said floor and defining a passageway therebetween, and opposing longitudinal ends, a first opening located at one longitudinal end of said base member and a second opening located at the other longitudinal end of said base member, said first and second ends providing a means for ingress and egress to the device by an animal, a central support member extending generally horizontally between each of said base member sidewalls and including a tubular conduit attached to and extending generally perpendicularly upwardly from the central support member, said conduit defining a continuous conduit interior, a first and second door, each of said doors being formed in a generally L-shaped configuration and said first door being functionally adapted to cover the first base member opening and said second door being functionally adapted to cover the second base member opening, said doors being hingedly attached to said central support member, a cable having a first cable end and a second cable end, said first cable end being attached to said first door and said second cable end being attached to said second door, said cable further having a central cable portion that is folded over onto itself and is routed through the conduit interior, an aperture defined within said central support member, said central support member aperture being functionally adapted to receive the folded over portion of said cable therethrough, said aperture being located at one end of the conduit such that the folded over portion of said cable extends through the aperture and forms a cable loop that extends downwardly from the central support member, and a bait assembly, said bait assembly being attachable to the folded over portion of said cable by means of a fastener that is slidably attached to the cable loop that extends downwardly from the central support member and being configured to hold a bait thereby.

14. The live-trapping device of claim 13 wherein said bait assembly comprises a vertically oriented central bait portion, said bait portion having an upper end and a lower end, an attachment means located at said bait portion upper end for removably securing said assembly to said fastener, an annular flange located at said bait portion lower end, and a bait assembly anchor, said bait assembly anchor being attached to the floor of said base member portion directly below the central support member aperture wherein a bait can be used as the central bait portion or be held by it for attracting animals to the bait assembly.

15. The live-trapping device of claim 14 wherein said bait assembly anchor includes a slot defined within it, said slot being functionally adapted to receive a portion of the annular flange of said bait assembly therewithin.

16. The live-trapping device of claim 14 wherein at least one of the sidewalls includes an access opening defined within it for ingress and egress of an animal therethrough and an access opening door for preventing ingress and egress therethrough.

17. The live-trapping device of claim 15 wherein a number of different baits can be used as the central bait portion or be held by it.

18. The live-trapping device of claim 14 wherein said base member further includes at least one clear reservoir containing bait, said reservoir being removably attachable to an outer surface of said base member.

19. The live-trapping device of claim 14 wherein each of said doors includes a side edge and further includes a locking mechanism for securing the doors when each door is covering a base member opening, said locking mechanism including a spring loaded latch pin located at each side edge of each door and further including an inwardly biased latch pin slide cooperatively mounted to the sidewalls of the base member such that, upon downward movement of the doors, the latch pins are urged inwardly to the point that each latch pin passes over the slide and then below it thereby securing the door when the door is in position to close off one of the openings to the device.

20. The live-trapping device of claim 19 wherein the locking mechanism includes a pair of spring biased pins axially disposed along each door and a cooperating pin slide having a lower edge whereby the pin may releaseably engage the lower edge to effectively lock the door and further includes at least one cooperating latch cable that interconnects each latch pin wherein a pulling force exerted on the latch cable withdraws the latch pins inwardly and release each latch pin from engagement with the lower edge of its corresponding slide.

21. The live-trapping device of claim 14 wherein the central support aperture and the bait assembly are disposed to one side of the passageway defined within the device.

22. The live-trapping device of claim 14 including a secondary holding device for providing a plurality of animal holding compartments into which an animal may pass when it is allowed to exit through the side access door of the device.

23. The live-trapping device of claim 14 wherein the first and second doors each include means for slidably inserting a removable protective panel therewithin, said panels providing protection from the elements for an animal being contained within the device.

24. The live-trapping device of claim 16 including a covering, said covering including a covering opening for accessing the device side door.

* * * * *